United States Patent
Le-Roy et al.

(10) Patent No.: US 11,052,902 B2
(45) Date of Patent: Jul. 6, 2021

(54) METHOD FOR DETERMINING THE MAXIMUM FORCE TO BE TRANSMITTED TO THE DRIVING WHEELS OF A VEHICLE PROVIDED WITH A HYBRID POWER TRAIN

(71) Applicant: RENAULT s.a.s., Boulogne-Billancourt (FR)

(72) Inventors: Loic Le-Roy, Issy-les-Moulineaux (FR); Jean-Martin Ruel, Epinay-sur-Orge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 369 days.

(21) Appl. No.: 16/086,932

(22) PCT Filed: Mar. 16, 2017

(86) PCT No.: PCT/FR2017/050613
§ 371 (c)(1),
(2) Date: Feb. 28, 2019

(87) PCT Pub. No.: WO2017/162959
PCT Pub. Date: Sep. 28, 2017

(65) Prior Publication Data
US 2019/0193718 A1    Jun. 27, 2019

(30) Foreign Application Priority Data
Mar. 21, 2016   (FR) ........................................ 1652411

(51) Int. Cl.
*B60W 20/30*    (2016.01)
*B60W 30/19*    (2012.01)
(Continued)

(52) U.S. Cl.
CPC ............ *B60W 20/30* (2013.01); *B60W 20/15* (2016.01); *B60W 30/188* (2013.01);
(Continued)

(58) Field of Classification Search
CPC .... B60W 20/30; B60W 20/15; B60W 30/188; B60W 30/1882; B60W 30/19;
(Continued)

(56) References Cited

U.S. PATENT DOCUMENTS 6,076,032 A * 6/2000 Kuroda ................. B60W 30/18
                                                      477/97
6,155,954 A * 12/2000 Itoyama ................ B60W 10/06
                                                      477/5
(Continued)

FOREIGN PATENT DOCUMENTS

DE    199 45 449 A1    3/2000
DE    102 49 689 A1    5/2004
(Continued)

OTHER PUBLICATIONS

International Search Report dated Jun. 8, 2017 in PCT/FR2017/050613 filed Mar. 16, 2017.
(Continued)

*Primary Examiner* — Gertrude Arthur Jeanglaude
(74) *Attorney, Agent, or Firm* — Oblon, McClelland, Maier & Neustadt, L.L.P.

(57) ABSTRACT

A method determines a force to be transmitted to driving wheels of a vehicle provided with a hybrid power train with several gear ratios and a traction battery. The method includes determining, over all of a speed range that the vehicle is capable of achieving, a maximum force that the power train is theoretically capable of transmitting to the wheels in predetermined nominal conditions of charge of the traction battery and/or of outside temperature and/or of
(Continued)

atmospheric pressure; and determining, over all of the speed range, a drivability force that the power train is capable of transmitting to the wheels. The drivability force confirms that whatever the value of the speed of the vehicle, the drivability force is less than or equal to the maximum force; and the drivability force evolves within the speed range without exhibiting an inflexion point at values of the speed requiring a gear change.

5 Claims, 4 Drawing Sheets

(51) Int. Cl.
*B60W 30/188* (2012.01)
*B60W 20/15* (2016.01)

(52) U.S. Cl.
CPC ........ *B60W 30/1882* (2013.01); *B60W 30/19* (2013.01); *B60W 2510/244* (2013.01); *B60W 2510/248* (2013.01); *B60W 2520/10* (2013.01); *B60W 2555/20* (2020.02); *B60W 2710/0666* (2013.01); *B60W 2710/1005* (2013.01); *B60W 2720/106* (2013.01); *B60W 2720/30* (2013.01); *Y02T 10/40* (2013.01); *Y02T 10/84* (2013.01)

(58) Field of Classification Search
CPC ....... B60W 2555/20; B60W 2510/244; B60W 2510/248; B60W 2520/10; B60W 2710/0666; B60W 2710/1005; B60W 2720/106; B60W 2720/30; Y02T 10/40; Y02T 10/84
USPC .......................................................... 701/22
See application file for complete search history.

(56) References Cited

U.S. PATENT DOCUMENTS

| 2007/0198161 | A1* | 8/2007 | Pfeiffer | ................ | B60W 10/04 |
| | | | | | 701/93 |
| 2013/0261862 | A1* | 10/2013 | Nishimori | ................ | B60K 6/52 |
| | | | | | 701/22 |
| 2016/0075323 | A1* | 3/2016 | Planche | ................... | B60K 6/48 |
| | | | | | 701/22 |
| 2017/0057494 | A1* | 3/2017 | Sato | ................ | B60W 30/18172 |
| 2017/0137023 | A1* | 5/2017 | Anderson | ............. | B60W 50/14 |

FOREIGN PATENT DOCUMENTS

| DE | 10249689 A1 * | 5/2004 | ......... F16H 61/0213 |
| DE | 10 2004 051 004 B3 | 6/2006 | |
| FR | 3 004 231 A1 | 10/2014 | |

OTHER PUBLICATIONS

French Preliminary Search Report dated Nov. 16, 2016 in Patent Application No. 1652411 filed Mar. 21, 2016.

* cited by examiner

METHOD FOR DETERMINING THE MAXIMUM FORCE TO BE TRANSMITTED TO THE DRIVING WHEELS OF A VEHICLE PROVIDED WITH A HYBRID POWER TRAIN

BACKGROUND

The present invention relates to a method for determining the maximum force to be transmitted to the driving wheels of a vehicle provided with a hybrid power train. It applies quite particularly to hybrid vehicles.

In the current context of consensus concerning global warming, the reduction of carbon dioxide ($CO_2$) emissions is a major challenge confronting the automobile constructors, the relevant standards being evermore demanding.

In addition to the constant improvement in conventional heat engine efficiencies, which is accompanied by a lowering of the $CO_2$ emissions, the electric vehicles ("EV") and the thermal-electric hybrid vehicles ("HEV") from the acronym "Hybrid Electric Vehicle") are these days considered to be the most promising solution for reducing $CO_2$ emissions.

Various electrical energy storage technologies have been tested in recent years in order to address the needs of the EVs and HEVs. It now appears that the lithium-ion (Li-ion) cell batteries are those likely to provide the best trade-off between power density, which favors the performance levels in terms of acceleration in particular, and energy density, which favors range. At the current time, the main factor slowing down the growth of these vehicles remains the still limited range of the Li-ion batteries.

For the HEVs in particular, this limited range is reflected by the fact that the vehicle is capable of running in "pure electric" or quite simply "electric" mode, that is to say without assistance from the heat engine, only over very short distances, as long as the state of charge of the traction battery remains above a predetermined upper threshold. Below this upper threshold of state of charge, the heat engine comes to the assistance of the electric machine, the vehicle then running in "hybrid" mode and therefore emitting a little more $CO_2$. Also, below a predetermined lower threshold, the heat engine purely and simply replaces the electric machine, which is no longer used, the vehicle then running in "pure thermal" or quite simply "thermal" mode, and therefore emitting even a little more $CO_2$. The state of charge of the traction battery is driven between the upper threshold and the lower threshold by an energy management law, implemented in the central computer of the HEV, which can in particular recharge the battery in regenerative braking phases. In addition to the drawback of the increase in $CO_2$ emissions in hybrid mode and in thermal mode, such operation according to the level of charge of the battery can also have a negative impact on the services provided to the driver. This is a problem that the present invention sets out to resolve.

Among the services likely to be impacted by the level of charge of the battery, one that can be cited in particular is drivability, which is these days a critical criterion in the general assessment of a vehicle. Drivability can for example be judged on different criteria, such as the maximum acceleration or the maximum speed that the power train can achieve. However, with respect to HEVs, which are provided with an automatic gearbox, it is above all the gentle, progressive and precise response of the power train to a request from the driver, throughout the automatic gear changes, which makes drivability. In particular, it is the facility to a seamless or jerk-free acceleration from one gear to another, that is to say with a progressive variation of the acceleration from one gear to another. Now, as explained previously, depending on the level of charge of the traction battery, the electric machine of an HEV is available to transmit torque to the wheels, or it is not, without the possibility of anticipating this. This is reflected by discontinuity in the torque transmitted to the wheels, and therefore in the acceleration, to the detriment of the drivability. Likewise, at the maximum state of charge of the traction battery, it may be that the performance levels of the heat engine are reduced for reasons that cannot a priori as yet be predicted, such as the altitude or the temperature for example. There again, this is reflected by discontinuities in the torque transmitted to the wheels throughout the automatic gear changes, still to the detriment of drivability. This too is a problem that the present invention sets out to resolve.

In order to limit the discontinuities in the torque transmitted to the wheels, methods for avoiding a break of torque at gear changes are known, that is to say methods for avoiding having the torque be canceled out briefly as on a vehicle with manual gearbox, such as, for example, the method described in EP 2 862 770 A1. One drawback with this method is that, even though there is no break in the torque transmitted to the wheels at the gear changes, there is nevertheless an inflection of the torque curve at the gear changes, to the detriment of drivability. This too is a problem that the present invention sets out to resolve.

BRIEF SUMMARY

The aim of the invention is in particular to overcome the abovementioned drawbacks, in particular those linked to the inflections of the curve of the torque transmitted to the wheels at the gear changes. For that, the invention proposes intelligently limiting the maximum force transmitted to the wheels. To this end, the subject of the invention is a method for determining the force to be transmitted to the driving wheels of a vehicle provided with a hybrid power train with several gear ratios and a traction battery. The method includes a step of determination, over all the speed range that the vehicle is capable of achieving, of the maximum force that the power train is theoretically capable of transmitting to the wheels in predetermined nominal conditions of charge of the traction battery and/or of outside temperature and/or of atmospheric pressure. The method also includes a step of determination, over all the speed range that the vehicle is capable of achieving, of a drivability force that the power train is capable of transmitting to the wheels. The drivability force confirms on the one hand that, whatever the value of the speed of the vehicle, the drivability force is less than or equal to the maximum force. On the other hand, the drivability force evolves within the speed range without exhibiting an inflection point at the values of the speed requiring a gear change.

In a preferential embodiment, in case of a request for maximum acceleration from the driver at a given speed, the method can also include a step of computation of a degradation coefficient that can be equal to the ratio between the maximum force that the power train is really capable of transmitting to the wheels at the given speed, given the real conditions of charge of the traction battery and/or of outside temperature and/or of atmospheric pressure, and the maximum force that the power train is theoretically capable of transmitting to the wheels at the given speed in the predetermined nominal conditions, as well as a step of computation of a corrected drivability force to be actually transmitted to the wheels that can be equal to the product of the degradation coefficient by the theoretical maximum force at the given speed.

Advantageously, the step of determination of the maximum force can include determining the upper envelope of the curves representing, for each of the gear ratios, the trend of the force transmitted to the wheels as a function of the speed of the vehicle.

Advantageously, the step of determination of the drivability force can include determining an upwardly concave curve passing through at least one inflection point of the upper envelope.

Another subject of the present invention is a computer comprising hardware and software means implementing such a method.

A final subject of the present invention is a hybrid vehicle comprising such a computer.

BRIEF DESCRIPTION OF THE DRAWINGS

Other features and advantages of the invention will become apparent from the following description given in light of the attached FIGS. 1 to 7 which illustrate the following.

DETAILED DESCRIPTION

Figure 1:
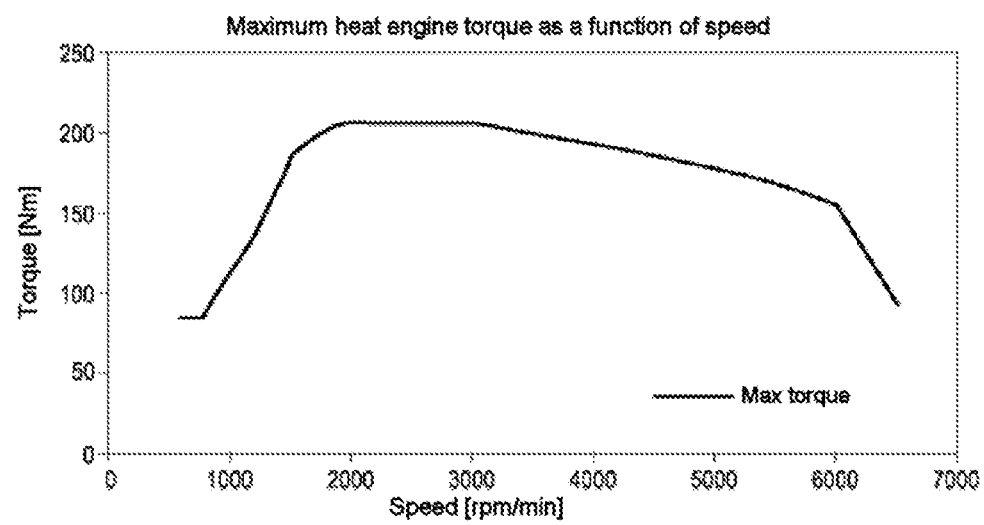
FIG. 1 illustrates the maximum engine torque as a function of speed.

FIG. 1 illustrates, for a given power train, the trend of the maximum engine torque that the latter can produce in newton-meters (Nm) represented on the y axis, as a function of the engine speed in revolutions per minute (rpm), represented on the x axis. Such a maximum torque profile, increasing very rapidly then decreasing slowly, is characteristic of the maximum torque of a heat engine, and is so whatever the gear ratio selected. However, the issue remains the same when it is an electric power train or when it is a hybrid power train.

Figure 2:
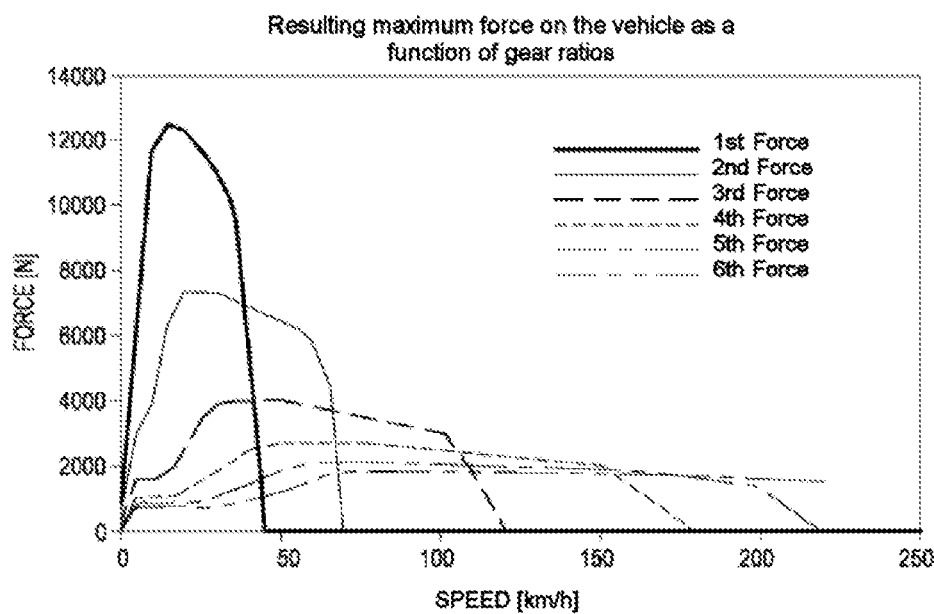
FIG. 2 illustrates the maximum force on a vehicle as a function of speed.

If, as illustrated by FIG. 2 in the case of an HEV, the profile of FIG. 1 is transposed into a reference frame which illustrates the trend of the force transmitted to the vehicle in netwons (N), represented on the y axis, as a function of the speed of the vehicle in kilometers per hour (km/h), represented on the x axis, it can be seen that a hybrid power train, when it is associated with its transmission, is not capable of transmitting a constant force to the vehicle. FIG. 2 shows that that is true whatever the gear, which can vary from 1 to 6 in the example of this figure, each of the 6 gears corresponding to a curve in FIG. 2, even if the amplitude of variation of this force transmitted to the vehicle decreases very strongly from one gear to a higher gear. It should be noted that that is also true in the case of a thermal or electrical power train.

Figure 3:
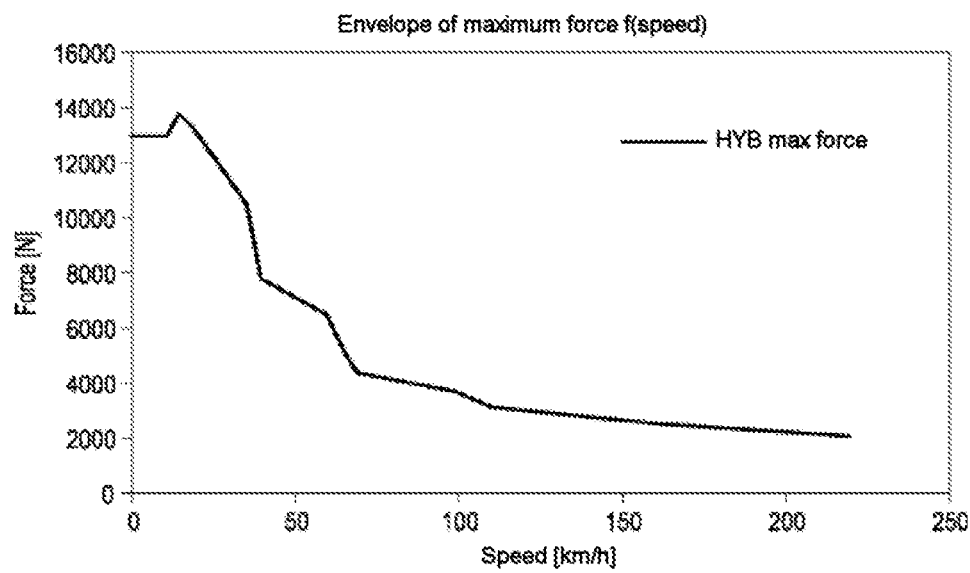
FIG. 3 illustrates the envelope of the maximum force on a vehicle as a function of speed.

Thus, in a so-called verve maneuver, which consists in accelerating and keeping the foot pressed to the floor on the accelerator pedal, the driver is in fact demanding the power train to supply its maximum torque from the first gear to the last, which amounts to applying to the vehicle the force curve illustrated by FIG. 3, called "HYB max force", because it corresponds to a hybrid power train, which is obtained simply by plotting the upper envelope of the 6 curves corresponding to the 6 gears, like the curves of FIG. 2 for another power train. This curve is conventionally known to the central computer of any vehicle, in the form of a discretized mapping for example. It is found that this curve of force transmitted to the vehicle comprises numerous fairly abrupt inflection points, which are reflected in the form of discontinuities or jerks in the acceleration of the vehicle. It should be noted that these discontinuities or these jerks are perceived more by the driver if the vehicle has a transmission of DCT or IVT type, commonly used on HEVs.

Figure 4:
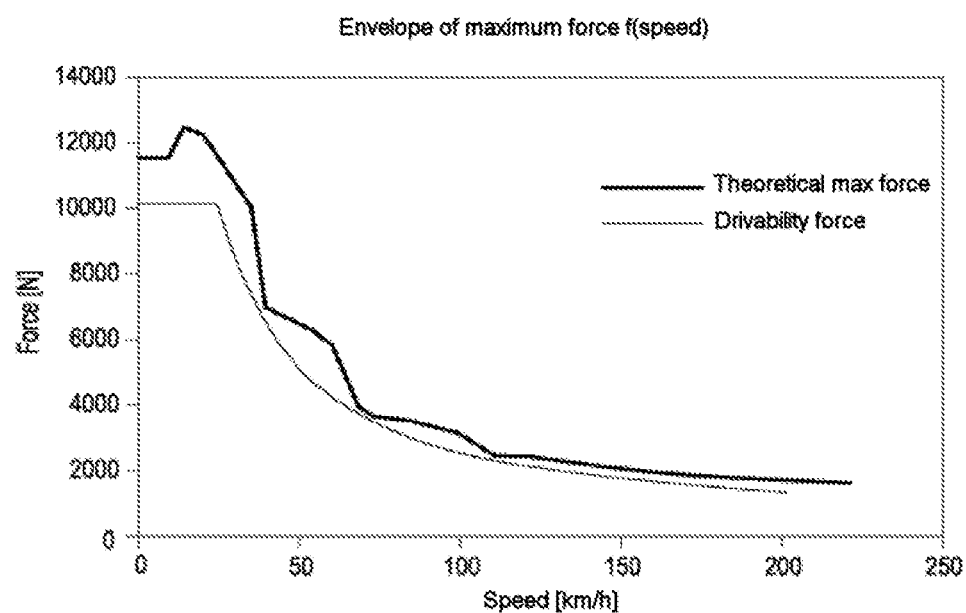
FIG. 4 illustrates a curve of maximum force achievable for drivability.

As illustrated in FIG. 4, to eliminate these discontinuities or these jerks, one of the principles of the invention is to define a curve of maximum force achievable for drivability, called "drivability force" in the figure, this curve being always slightly below the curve of theoretical force that the vehicle can provide, called "theoretical max force" in the figure. In the example of the figure, the "drivability force" curve is the upwardly concave parabolic curve, which is lower than the "theoretical max force" curve at all points, and which passes through numerous inflection points of the "theoretical max force" curve, at least one in all cases. By requiring the driver to be able to best follow this "drivability force" curve in case of a "verve" maneuver, the performance levels of the vehicle in terms of pure acceleration may indeed be reduced, but, equally, all the discontinuities or jerks are eliminated: the acceleration is "smoothed" over all the range of the gears. This curve can be determined and memorized by the central computer of the vehicle, in the form of a discretized mapping for example.

Figure 5:
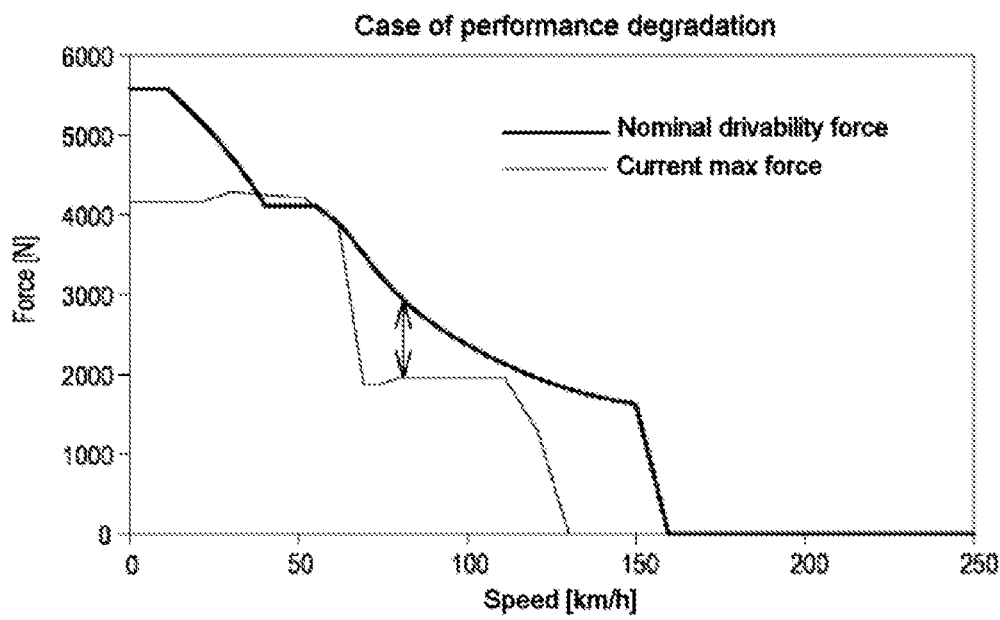
FIG. 5 illustrates a curve of the current maximum force.

This first principle according to the invention, namely using a "drivability force" curve for the maneuvers of "verve", therefore offers the advantage of preventing the discontinuities or the jerks in the nominal cases of operation of the vehicle, that is to say when the battery is far from its minimum state of charge and when the temperature and pressure conditions are normal. However, in some case, it may be that a hybrid power train is not even capable of ensuring the maximum torque illustrated by the "drivability force" curve. For example in the case of a discharged or cold battery, the electric vehicle may not be capable of supplying the maximum electric torque necessary to follow the "theoretical max force" curve. Similarly, in very hot and/or low atmospheric pressure conditions, the heat engine may not be capable of supplying the maximum thermal torque necessary to follow the "theoretical max force" curve. In both cases, the performance levels of the power train can greatly decrease and, if nothing is done, the real limitation of the power train may become lower than the drivability limitation defined by the "drivability force" curve, as illustrated in FIG. 5 by a "current max force" curve. In this case, the use, in the creation of the will of the driver, of a drivability limitation according to the invention therefore becomes insufficient, because the curve of real limitation comprises numerous inflection points that are felt by the driver. To sum up, the initial problem has returned, even if it occurs less frequently given that the generation of the will of the driver uses a curve of drivability limitation according to the invention. This is why another principle of the invention is to detect any significant lowering of performance, as illustrated by the "current max force" curve and by a doubleheaded arrow in FIG. 5, in order to adapt the curve of drivability limitation to this lowering.

From the current maximum force that can actually be transmitted to the vehicle and from the drivability force known through the "drivability force" curve, the invention proposes determining a coefficient representing the current value of the performance degradation relative to the drivability force. In this way, it is possible to adapt or correct in real time the curve of drivability limitation, in order to transmit a corrected force during a verve maneuver.

Figure 6:
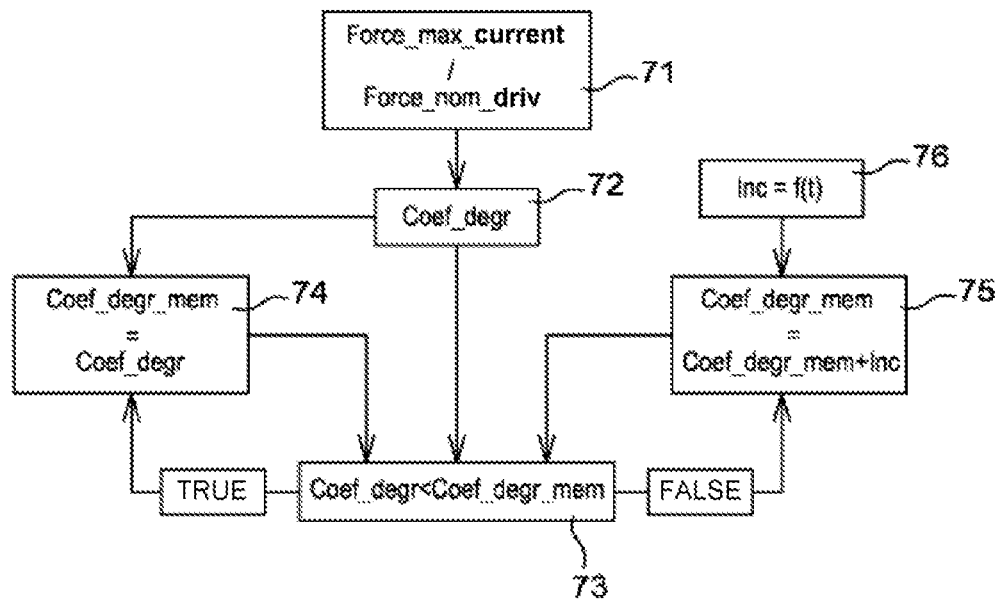
FIG. 6 illustrates a method for determining a degradation coefficient.

Thus, a degradation coefficient Coef_degr can be computed as illustrated by FIG. 6. The first step is to compute, in a software block 71, the degradation coefficient by comparing the maximum force available at the current instant t, called Force_max_current, which is conventionally made available by the central computer of the vehicle, with the nominal drivability force, called Force_nom_driv, supplied by the curve of drivability limitation according to the invention and stored in the memory of the central computer. The block 71 supplies as output the degradation coefficient, which is memorized in a variable Coef_degr by a software block 72. Coef_degr lies between 0 and 1, where 0 represents the maximum degradation and 1 the absence of degradation. In a block 73, Coef_degr is then compared to the previously computed last value of the degradation coefficient, which is memorized in a variable Coef_degr_mem. It can be noted that, for the first iteration, Coef_degr_mem is initialized at 1, which is the nominal value of the degradation coefficient.

If the coefficient Coef_degr is strictly lower than the last value previously computed and memorized in Coef_degr_mem (TRUE transition), then the new value stored in Coef_degr is memorized in Coef_degr_mem by a software block 74, the old value being lost.

Otherwise, if the coefficient Coef_degr is greater than or equal to the last value previously computed and memorized in Coef_degr_mem (FALSE transition), then Coef_degr_mem is incremented by a software block 75 by an offset "Inc" dependent on the current instant t supplied by a software block 76, so as to go back up little by little to the nominal value of the degradation coefficient, namely 1.

Figure 7:
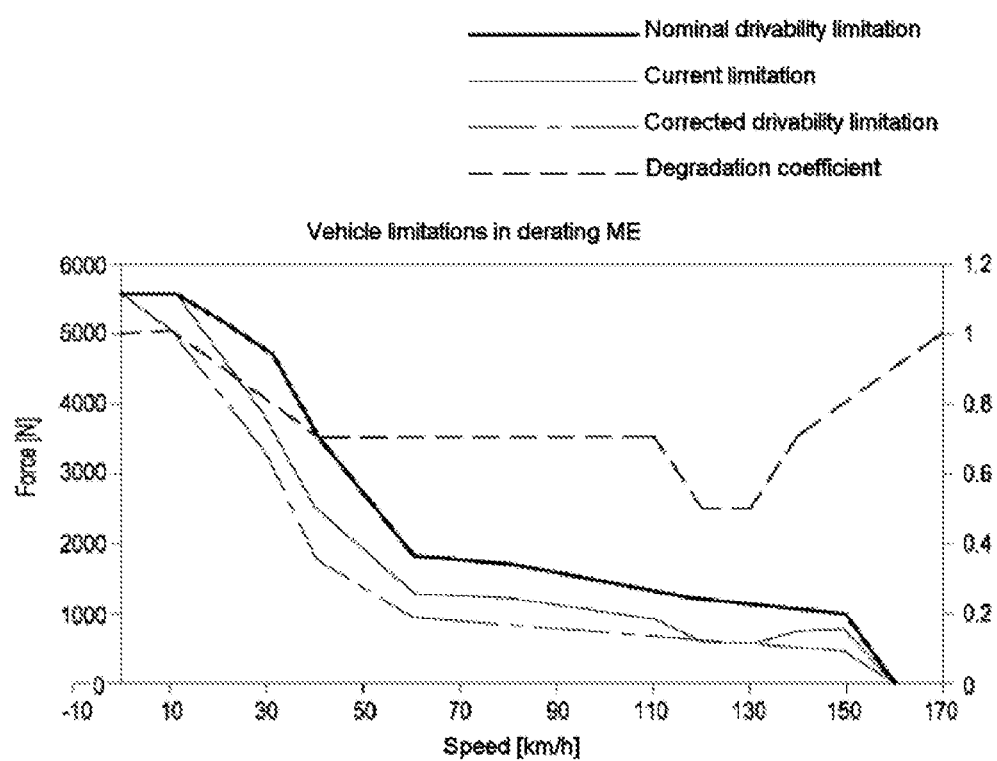
FIG. 7 illustrates various vehicle limitations as a function of speed.

In the case of a performance degradation, the invention acts as illustrated by FIG. 7, which illustrates, on the one hand, a curve of nominal drivability limitation according to the invention, a curve of "real" current limitation with numerous force discontinuities, the trend of the degradation coefficient which results from the comparison of the two preceding curves according to the method illustrated by FIG. 6, and finally the curve of corrected drivability which results from the application of the degradation coefficient to the curve of nominal drivability limitation, according to the method illustrated by FIG. 6. It is indeed found that the corrected drivability limitation is modulated to be always located below what can actually be produced by the vehicle, that is to say below the curve of "real" current limitation. According to the invention, in a "verve" maneuver, the driver can have access only to the corrected drivability limitation and thus is no longer affected by the real current limitation, which includes force discontinuities. These force discontinuities are therefore not felt by the driver.

In a particular embodiment, the driver could first of all choose an energy mode of the vehicle out of:
"auto hybrid": the energy management law would be free to choose the operation without constraint from the driver;
"forced ZEV": the driver could prioritize the use of running in pure electric mode, via battery discharge, because he or she is driving in a town for example;
"range saver": the driver could prioritize maintaining the battery charge via the increased use of the heat engine, for example because he or she knows that he or she will finish his or her journey in town and that he or she will then switch to "forced ZEV" mode. A curve of drivability limitation and therefore a drivability force could then be deduced as a function of the energy mode chosen.

Another advantage of the present invention is that the torque limitation is transparent to the driver: there is very little chance that he or she will perceive it from one "verve" maneuver to another. Finally, the invention makes it possible to always maintain the level of charge of the battery at an acceptable level, such that the system is never destabilized (particularly by maintaining the state of charge of the traction battery within an operational range), and even if the driver strings together "verve" maneuvers.

The invention claimed is:

1. A method for determining a force to be transmitted to driving wheels of a vehicle provided with a hybrid power train with several gear ratios and a traction battery, the method comprising:
   determining, over all of a speed range that the vehicle is capable of achieving, a maximum force that the power train is theoretically capable of transmitting to the wheels in predetermined nominal conditions of charge of the traction battery and/or of outside temperature and/or of atmospheric pressure;
   determining, over all of the speed range that the vehicle is capable of achieving, a drivability force that the power train is capable of transmitting to the wheels, said drivability force confirming that:
      whatever the value of the speed of the vehicle, the drivability force is less than or equal to the maximum force; and
      the drivability force evolves within the speed range without exhibiting an inflexion point at values of the speed requiring a gear change,
   wherein, in case of a request for maximum acceleration from the driver at a given speed, the method further comprises:
      computing a degradation coefficient, said coefficient being equal to a ratio between:
         a maximum force that the power train is really capable of transmitting to the wheels at the given speed at a current instant, given the real conditions of charge of the traction battery and/or of outside temperature and/or atmospheric pressure, and;
         the maximum force that the power train is theoretically capable of transmitting to the wheels at the given speed in the predetermined nominal conditions; and
      computing a corrected drivability force to be actually transmitted to the wheels, said corrected force being equal to the product of the degradation coefficient by the theoretical maximum force at the given speed,
   wherein the computing the degradation coefficient comprises:
      comparing the degradation constant to a previously stored degradation constant stored in a memory; and
      when the degradation constant is greater than or equal to the previously stored degradation constant, incrementing the previously stored degradation constant by an offset that is dependent upon the current instant.

2. The method as claimed in claim 1, wherein the determining the maximum force includes determining an upper envelope of curves representing, for each of the gear ratios, a trend of the force transmitted to the wheels as a function of the speed of the vehicle.

3. The method as claimed in claim 2, wherein the determining the drivability force includes determining an upwardly concave curve passing through at least one inflexion point of the upper envelope.

4. A non-transitory computer readable medium storing a processing program that, when executed by a computer, causes the computer to execute the method as claimed in claim 1.

5. A hybrid vehicle, comprising:
    the non-transitory computer readable medium as claimed in claim 4.

\* \* \* \* \*